US008674633B2

(12) United States Patent
Rouis

(10) Patent No.: US 8,674,633 B2
(45) Date of Patent: Mar. 18, 2014

(54) STARTING TIME CONTROL METHOD AND DEVICE FOR IC ENGINE

(75) Inventor: Oussama Rouis, Creteil (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 441 days.

(21) Appl. No.: 13/055,417

(22) PCT Filed: Jul. 9, 2009

(86) PCT No.: PCT/FR2009/051358
§ 371 (c)(1),
(2), (4) Date: May 17, 2011

(87) PCT Pub. No.: WO2010/010271
PCT Pub. Date: Jan. 28, 2010

(65) Prior Publication Data

US 2011/0227341 A1 Sep. 22, 2011

(30) Foreign Application Priority Data

Jul. 24, 2008 (FR) ..................................... 08 55071

(51) Int. Cl.
*H02P 6/20* (2006.01)
*F02N 11/08* (2006.01)

(52) U.S. Cl.
USPC ....... 318/400.11; 318/437; 318/479; 318/431

(58) Field of Classification Search
USPC .................... 318/139, 140, 151–158, 400.12, 318/400.14, 400.3, 712, 715, 720–724, 318/430–431, 437, 500, 504, 478, 479, 318/400.11
See application file for complete search history.

(56) References Cited

U.S. PATENT DOCUMENTS

| | | | | |
|---|---|---|---|---|
| 2,803,793 | A * | 8/1957 | Wible, Jr. | 388/820 |
| 3,215,915 | A * | 11/1965 | Fitzner | 318/575 |
| 4,698,577 | A | 10/1987 | Seymour et al. | |
| 4,812,730 | A * | 3/1989 | Nakagawa et al. | 318/732 |
| 2003/0034755 | A1* | 2/2003 | Krefta et al. | 318/801 |
| 2004/0150233 | A1 | 8/2004 | Kajiura | |
| 2006/0017290 | A1 | 1/2006 | Murty et al. | |
| 2010/0244753 | A1* | 9/2010 | Boudjemai et al. | 318/381 |

FOREIGN PATENT DOCUMENTS

| | | |
|---|---|---|
| DE | 10 2006 057892 | 6/2008 |
| EP | 1 469 587 | 10/2004 |

* cited by examiner

*Primary Examiner* — Bentsu Ro
(74) *Attorney, Agent, or Firm* — Berenato & White, LLC

(57) ABSTRACT

A method and device for controlling the starting time of a vehicle mounted thermal engine coupled mechanically to a polyphase rotary electrical machine with an inductor. The electrical machine includes phase windings and sensors for the position of a rotor, and is connected to an on-board electrical network. The method uses pre-fluxing by establishing an excitation current in the inductor for a predetermined pre-fluxing time, before establishment of phase currents. These phase currents are controlled by signals phase-shifted by an angle which varies according to a speed of rotation of the electrical machine, relative to synchronization signals produced by the sensors. During the starting time, the angle of phase-shifting is additionally dependent on a voltage of the on-board electrical network, in a range contained between a first and second voltages, with the second voltage being higher than the first. In the method, the starting time is independent from the voltage of the on-board electrical network.

12 Claims, 4 Drawing Sheets

STARTING TIME CONTROL METHOD AND DEVICE FOR IC ENGINE

FIELD OF THE INVENTION

The present invention relates to a method and a device for controlling the starting time of a thermal engine of a vehicle.

The invention also relates to a micro-hybrid system comprising this device.

BACKGROUND OF THE INVENTION

Considerations of energy saving and reduction of pollution, particularly in an urban environment, are leading motor vehicle manufacturers to equip their models with an automatic stopping/restarting system, such as the system known by the term "Stop and Go".

As stated by the company VALEO EQUIPEMENT ELECTRIQUES MOTEUR in patent application FR2875549, vehicles are enabled to function according to the "Stop and Go" mode by means of a reversible electrical machine, or alternator—starter, which is coupled to the thermal engine, and is supplied by an inverter in "starter" mode.

The use of an alternator—starter in a "Stop and Go" functioning mode consists, in certain conditions, of giving rise to complete stoppage of the thermal engine when the vehicle itself is at a standstill, then restarting the thermal engine, as a result, for example, of an action of the driver which is interpreted as a demand for restarting.

A typical "Stop and Go" situation is that of stopping at a red light. The driver stops the vehicle at the light, the thermal engine is automatically stopped, then, when the light turns green, the engine is restarted by means of the alternator—starter, as the result of detection by the system of the clutch pedal being pressed down by the driver, or any other action which conveys the wish of the driver to restart his vehicle.

It will be appreciated that the function of automatic restarting carried out by an alternator—starter system is a function which must be as transparent as possible for the driver of the vehicle.

In alternator—starters consisting of a polyphase rotary electrical machine with an inductor, the phase currents and the excitation current are generally supplied simultaneously by power circuits at the moment of restarting.

In American patent U.S. Pat. No. 6,335,609, it is found that in these circumstances the engine torque can be produced only with a perceptible delay.

This delay is due to the establishment of a magnetic flux in the rotor, and it is proposed to carry out pre-fluxing of the inductor before the establishment of the phase currents, such as to reduce the time which is necessary for the thermal engine to reach a predetermined speed of rotation.

However, the method is implemented by controlling the excitation current for a fixed duration, and does not appear to be suitable for alternator—starters which are supplied by an on-board network with variable voltage, of the "14+X" type, in so-called "micro-hybrid" systems.

A need therefore exists for a method and a device which make it possible to maintain within limits which are acceptable for the driver the starting time in the case of an architecture of an automatic stopping/restarting system of a micro-hybrid type, in which the voltage of the on-board electrical network depends on the state of charge of the ultra-capacitor.

SUMMARY OF THE INVENTION

The object of the present invention is to satisfy this need, and its objective is specifically a method for controlling the starting time of a thermal engine of a vehicle, which engine is coupled mechanically to a polyphase rotary electrical machine with an inductor.

This electrical machine, which in itself is known, comprises phase windings and sensors for the position of a rotor, of a number which is equal to the number of these phases, and it is connected to an on-board electrical network.

The method in question is of the type consisting of carrying out pre-fluxing by establishing an excitation current in the inductor for a predetermined pre-fluxing time, before establishment of phase currents.

These phase currents are controlled, also in a known manner, by control signals which are phase-shifted by an angle of phase-shifting which varies according to a speed of rotation of the electrical machine, relative to synchronisation signals produced by the sensors.

According to the invention, during the starting time, remarkably, the angle of phase-shifting is additionally dependent on a voltage of the on-board electrical network, in a range contained between a first and second voltages, with the second voltage being higher than the first.

By this means, in the method according to the invention, the starting time is independent from the voltage of the on-board electrical network.

Highly advantageously, the angle of phase-shifting for a present value of the speed of rotation is decreased when the voltage of the on-board electrical network increases between the first and second voltages.

Preferably, for each present value of the speed of rotation of the electrical machine, the angle of phase-shifting is constantly lower than, or equal to, a maximum angle of phase-shifting below which the starting time is higher than a reference threshold, when the voltage of the on-board electrical network is equal to the first voltage.

According to another characteristic of the method according to the invention, the predetermined pre-fluxing time is dependent on the voltage of the on-board electrical network.

This predetermined pre-fluxing time is preferably decreased when the voltage of the on-board electrical network increases between the first voltage and the second voltage.

The invention also relates to a device for controlling the starting time of a thermal engine of a vehicle, which device is designed to implement the above-described method.

In a known manner this thermal engine is coupled mechanically to a polyphase rotary electrical machine with an inductor, comprising phase windings and sensors for the position of a rotor, of a number which is equal to the number of phases.

The electrical machine is supplied by power circuits which are connected to at least one on-board electrical network, and are controlled by a control circuit.

This control circuit comprises first means for controlling phase currents by controls signals which are phase-shifted by an angle of phase-shifting which is variable according to a speed of rotation of the rotary electrical machine, relative to synchronisation signals which are produced by the sensors, and additionally comprises second means for controlling pre-fluxing.

The device according to the invention is distinguished in that it comprises first means for determination of the angle of phase-shifting during the starting time, according to a voltage of the on-board electrical network.

Preferably, these first means for determination are included in the said first control means, and comprise a memory containing tabulation of the angle of phase-shifting according to the speed of rotation of the rotary electrical machine and the voltage of the on-board electrical network.

The device according to the invention is also distinguished in that it additionally comprises second means for determination of a pre-fluxing time according to a voltage of the on-board electrical network.

These second means for determination are preferably included in the second control means, and highly advantageously comprise a memory containing tabulation of the pre-fluxing time according to the on-board electrical network for a reference threshold of the starting time of the thermal engine.

The device according to the invention for controlling the starting time of a thermal engine preferably relates to a vehicle, the on-board electrical network of which is connected to the terminals of at least one ultra-capacitor or the like.

Remarkably, thanks to this device, the starting time is constantly approximately 450 ms when the voltage of the on-board electrical network varies between 18 V and 24 V.

The invention thus also relates to a micro-hybrid system, which highly advantageously comprises the device for controlling the starting time of a thermal engine as previously described.

These few essential specifications will have made apparent to persons skilled in the art the advantages provided by the invention, in comparison with prior state of the art.

The detailed specifications of the invention are given in the following description, in association with the appended drawings. It should be noted that these drawings have no other purpose than to illustrate the text of the description, and do not constitute in any way a limitation of the scope of the invention.

Figure 4:
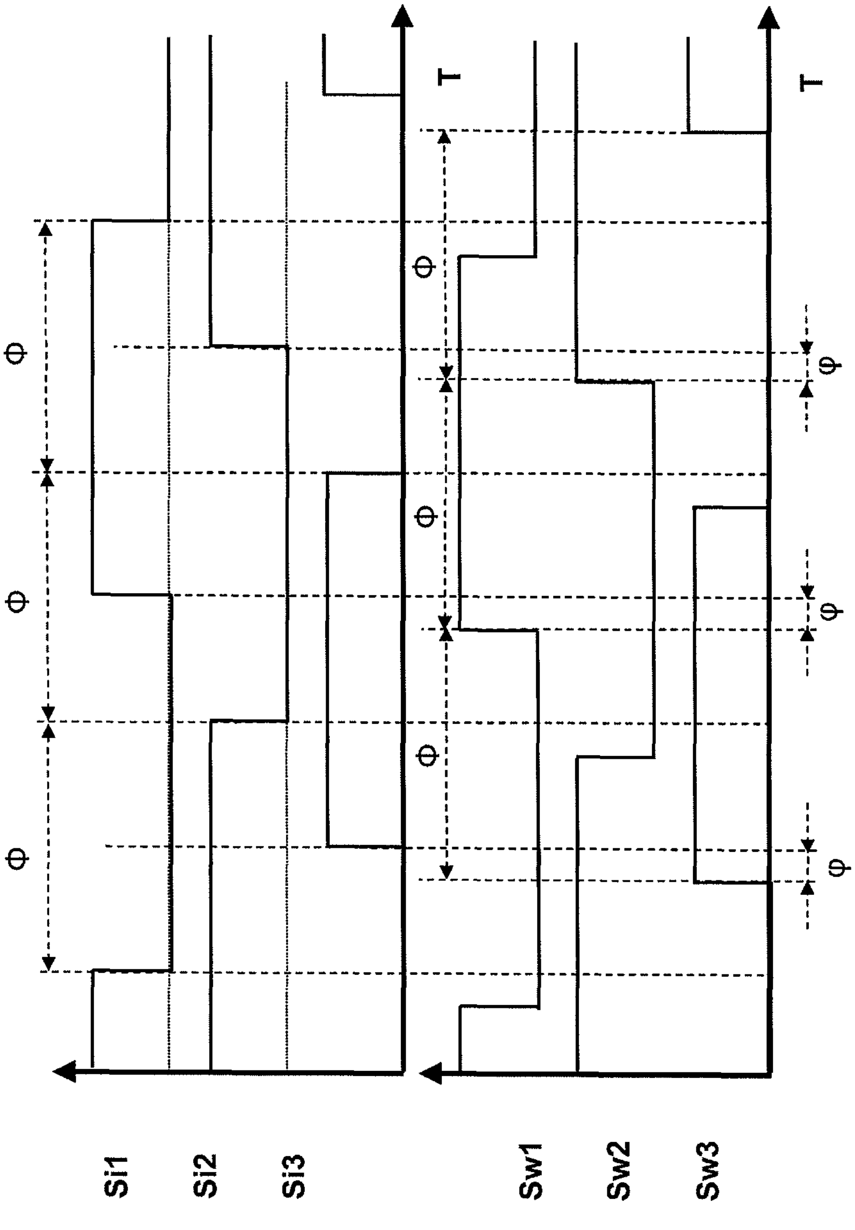

The flowcharts in FIG. 4 show schematically the angle of phase-shifting between the synchronisation signals produced by the sensors for the position of the rotor of a three-phase machine, and the signals to control the phase currents.

Figure 5:
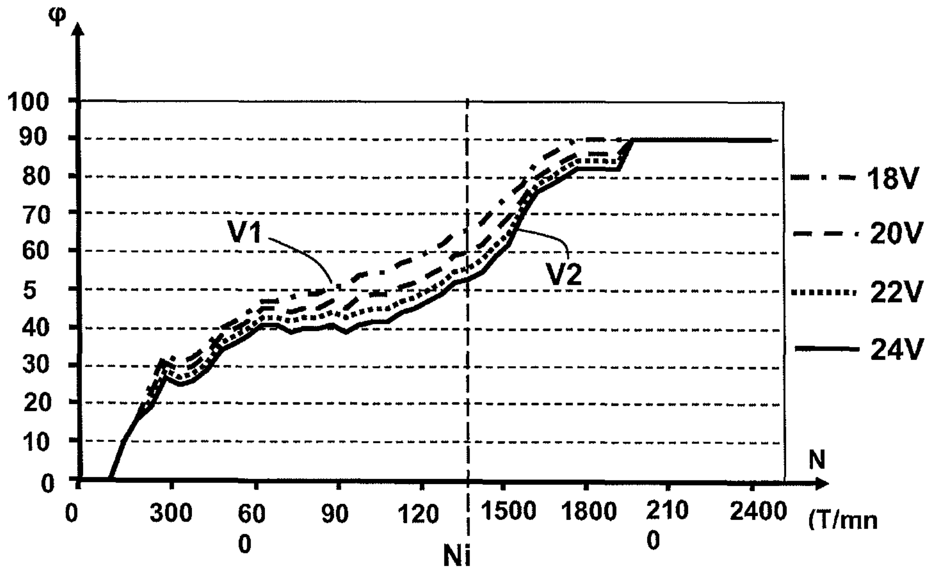

FIG. 5 shows the variations of this angle of phase-shifting according to the speed of rotation of the electrical machine, for a plurality of values of the voltage of the on on-board electrical network, so as to maintain a constant starting time, according to the invention.

DESCRIPTION OF THE PREFERRED EMBODIMENT OF THE INVENTION

Figure 1:
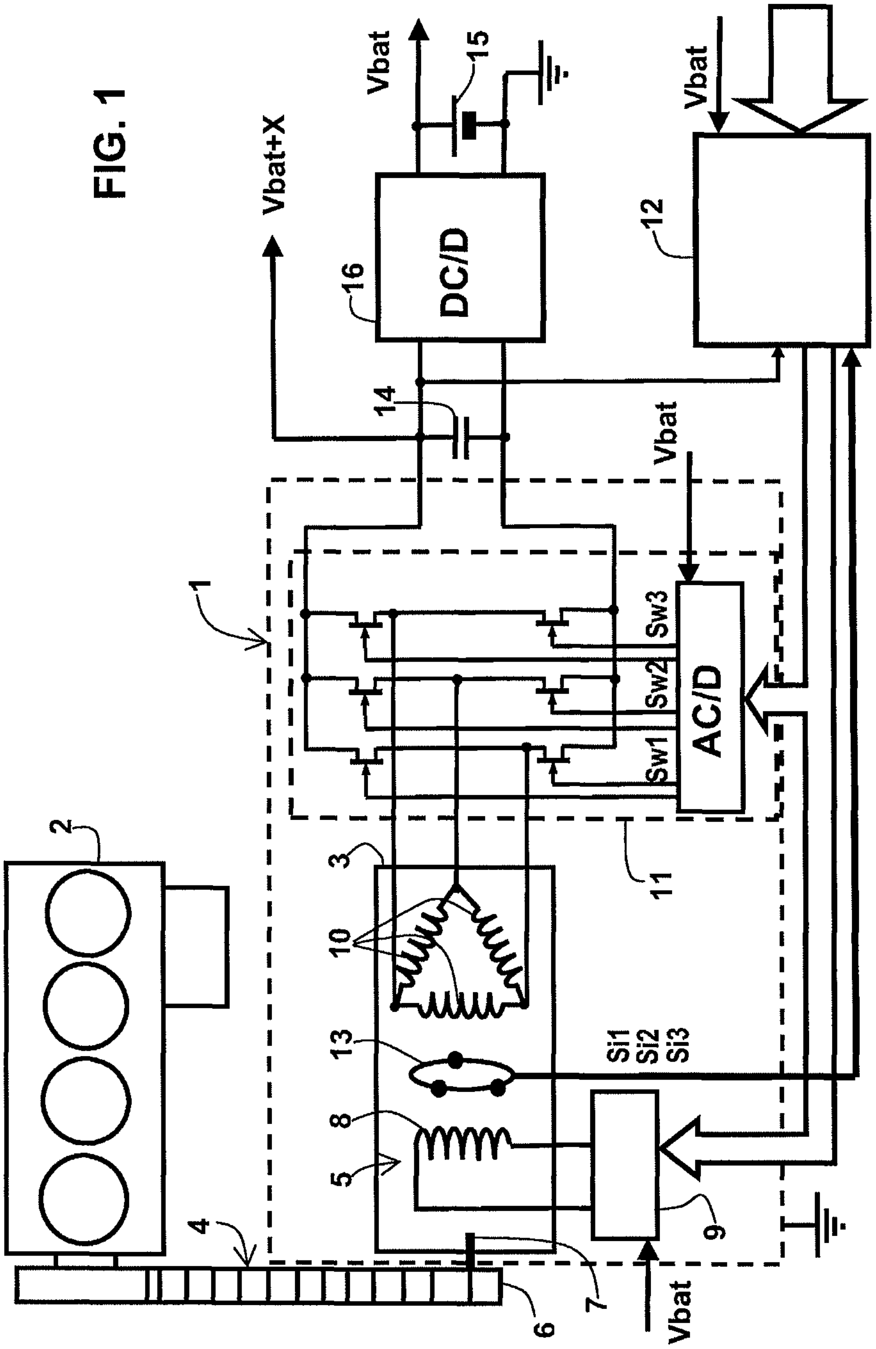
FIG. 1 is a schematic representation of a system for automatic stopping/restarting of the micro-hybrid type, using a device according to the invention to control the starting time.

The preferred embodiment of the invention concerns vehicles which are equipped with an alternator—starter with a device for recuperation of braking energy, of the micro-hybrid type, as represented schematically in FIG. 1.

FIG. 1 shows an alternator—starter 1 coupled to a thermal engine 2 of a vehicle.

This alternator—starter 1 comprises a polyphase electrical machine 3 with reversible excitation which is coupled to the engine 2 by means of a belt and pulley drive 4.

The electrical machine 3 comprises a rotor 5 which is integral with an output pulley 6 at the end of a shaft 7. The rotor 5 has an inductor 8 which is supplied by an excitation circuit 9 by means of a rotary collector.

The machine 3 also comprises phase or armature windings 10, which are supplied by an inverter 11.

A control circuit 12 controls the power circuits of the machine 3, constituted by the inverter 11 and the excitation circuit 9, according to the information supplied by a sensor for the position 13 of the rotor 5, and control signals which are generated by an electronic control unit of the vehicle.

The electronic control unit receives parameters of functioning of the engine 2, and other context information, by means of dedicated wired connections, or an on-board data communication bus of the CAN type.

The inverter 11 is preferably constituted by a chopper circuit for the voltage of the on-board electrical network Vbat+X which generates pulses, the frequency and width of which are controlled by the control circuit 12 when the alternator—starter 1 is functioning as an electric motor.

This same chopper circuit is a reversible alternating—direct converter which functions as a synchronous rectifier when the alternator—starter 1 is functioning as an alternator.

In the architecture of a micro-hybrid type represented in FIG. 1, the on-board electrical network is connected to the terminals of an ultra-capacitor 14, instead of being supplied directly by an on-board battery 15, as in a conventional architecture.

When it is functioning as a generator, the electrical machine 3 charges the ultra-capacitor 14 by means of the reversible alternating—direct converter 11 functioning as a rectifier, and supplies the on-board electrical network with a voltage Vbat+X which is higher than the battery voltage Vbat.

Energy conversion circuits 16 which are constituted by a direct—direct converter permit exchanges of electrical energy between the on-board battery 15 and the ultra-capacitor 14.

According to a general principle of the invention, within the context of a system which carries out the automatic restarting functions, it is proposed to maintain the starting time of the thermal engine 2 constant, irrespective of the voltage Vbat+X of the on-board electrical network.

Figure 2:
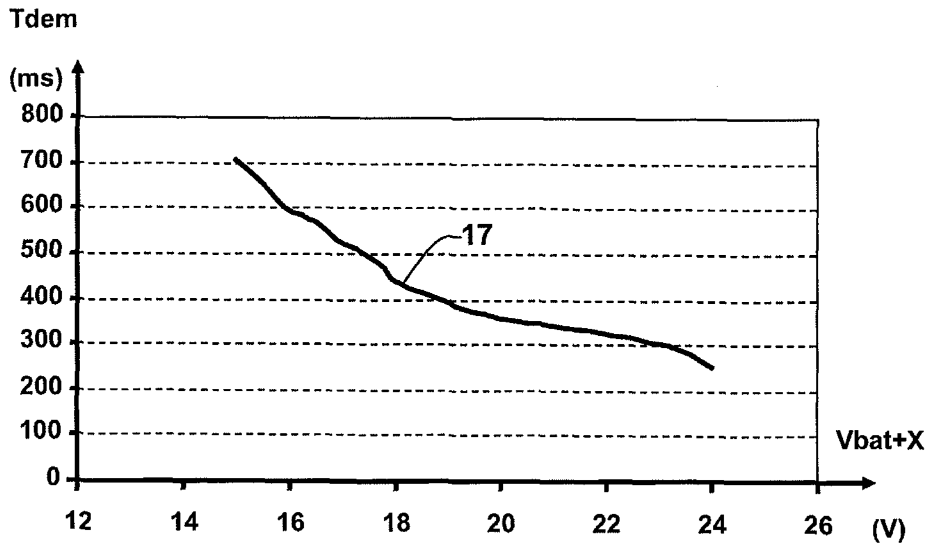
FIG. 2 shows the starting time of a thermal engine in a system for automatic stopping/restarting similar to that represented in FIG. 1, depending on the voltage of the on-board electrical network, in the absence of the device according to the invention.

In fact, as shown in FIG. 2, in the absence of implementation of appropriate corrective measures, the starting time Tdem of the thermal engine 2 depends on the voltage Vbat+X of the on-board electrical network, i.e. on the state of charge of the ultra-capacitor 14.

The measurements 17 have been carried out for a fixed pre-fluxing time Tpref-max of approximately 150 ms, corresponding to the magnetic saturation of the inductor 8, and a constant angle profile.

When the ultra-capacitor 14 is slightly charged, the starting time Tdem, defined as the interval of time between the instant when the electrical machine 3 applies torque to the thermal engine 2, and the instant when the latter reaches a reference speed of rotation, can in these conditions reach unacceptable values, taking into account the objective required of transparency of the system.

A weighting function is therefore proposed, which adjusts the starting parameters in order to assure a mean starting time Tdem for an entire range of nominal functioning voltages.

In the case of an ultra-capacitor 14 of the EDLC type (Electrochemical Double Layer Capacitor) with a capacity of 1500 F and a service voltage of 25 V, it is considered that the nominal functioning range V1, V2 is between 18 V and 24 V.

Figure 3:
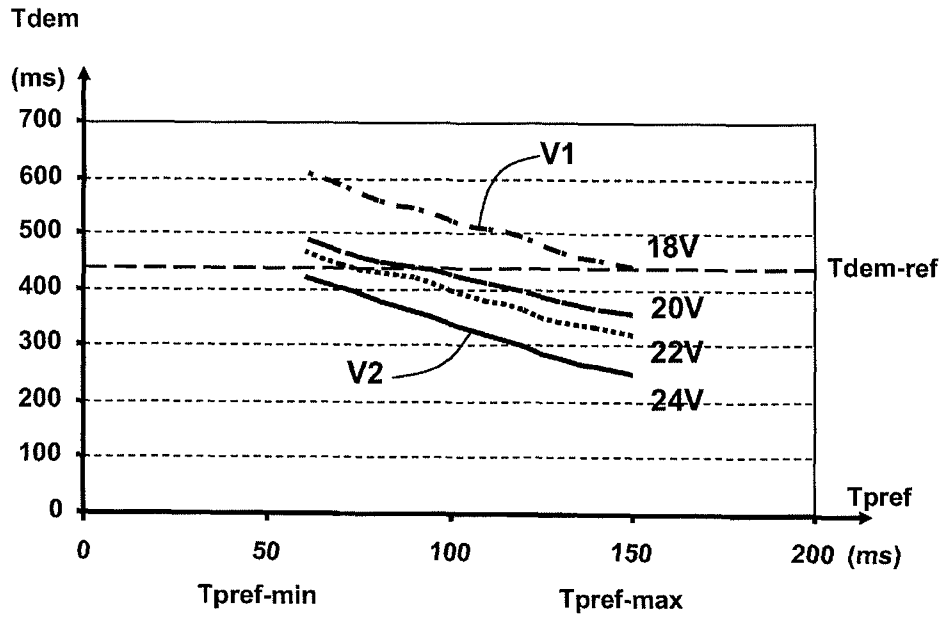
FIG. 3 shows the variations of the starting time according to the pre-fluxing time, and of a discreet set of levels of the voltage of the on-board electrical network in a system for stopping/automatic restarting similar to that represented in FIG. 1, in the absence of the device according to the invention.

FIG. 3 shows the results of tests carried out on a micro-hybrid system similar to that shown in FIG. 1, without a device for controlling the starting time, by making the pre-fluxing time Tpref vary, and for several levels of the voltage (18 V, 20 V, 22 V and 24 V) of the on-board electrical network Vbat+X.

The pre-fluxing time Tpref varies between a minimum value Tpref-min, below which the starting time is always higher than a reference threshold Tdem-ref, i.e. below which the starting function is downgraded, even at the maximum charge of the ultra-capacitor 14, and a maximum value Tpref-max, starting from which the magnetic saturation of the inductor 8 is observed.

The starting time Tdem depends on the instantaneous engine torque supplied by the electrical machine 3 during the starting, and this engine torque itself depends on the control of the machine 3, on the basis of the synchronisation signals Si1, Si2, Si3 produced by the position sensors 13 of the rotor 5.

FIG. 4 shows the synchronisation signals Si1, Si2, Si3 obtained from the sensors 13 of a three-phase machine which is represented schematically in FIG. 1.

These signals Si1, Si2, Si3 are 0.5 binary duty cycle signals, which have between them a single nominal phase-shifting ϕ which in this case is equal to 120°, with the machine having three phases.

In a known manner, the control of the electrical machine 3 requires the reconstruction of control signals Si1, Si2, Si3 of the chopper circuit 11 which switches the phases currents which, in a steady state, have between one another the same nominal phase-shifting cp, but have an angle of phase-shifting ϕ relative to the incoming signals Si1, Si2, Si3 which is variable according to the speed of rotation N.

In the method according to the invention, the starting time of the thermal engine 2 is rendered constant, irrespective of the voltage Vbat+X of the on-board electrical network, between 18 V and 24 V, by controlling the instantaneous torque of the electrical machine 3 throughout the duration of the starting.

For this purpose the angle of phase-shifting ϕ is dependent both on the speed of rotation N of the electrical machine, and the voltage of the on-board electrical network Vbat+X.

FIG. 5 shows four examples of curves of variation of the angle of phase-shifting ϕ according to the speed N, parameterised by four values of the voltage of the electrical network Vbat+X (18 V, 20 V, 22 V and 24 V), with the pre-fluxing time Tpref being set to the maximum value Tpref-max of approximately 150 ms.

The strategy of maintenance of a constant starting time Tdem, irrespective of the voltage of the on-board electrical network Vbat+X, consists of optimising the control parameters of the electrical machine 3 for the lowest voltage V1 of the on-board electrical network Vbat+X, and of downgrading the performance of the machine 3 for the highest network voltages Vbat+X.

For the lowest network voltage V1, the pre-fluxing time Tpref is therefore set to the maximum Tpref-max permitted by the magnetic saturation of the inductor 8, and the angle of phase-shifting ϕ is maintained at a maximum value ϕmax, such as to provide an optimum torque during the starting for each speed of rotation N.

When the voltage of the on-board electrical network Vbat+X increases to its highest value V2, the performance of the electrical machine 3 is downgraded, if the pre-fluxing time Tpref remains constant, by decreasing the angle of phase-shifting ϕ relative to the maximum angle of phase-shifting ϕmax for each present value Ni of the speed of rotation N, as clearly shown in FIG. 5.

For the high voltages of the on-board electrical network, the performance of the electrical machine 3 is also downgraded by decreasing the pre-fluxing time Tpref when the voltage of the on-board electrical network Vbat=X increases.

FIG. 3 shows that if a reference threshold Tdem-ref is selected as the starting time Tdem to be maintained constant, it is sufficient to use a linear interpolation with two dimensions in order to calculate the pre-fluxing time Tpref corresponding to each value of the voltage of the on-board electrical network Vbat+X contained in the nominal range of voltages V1 to V2 with a constant angle of phase-shifting profile ϕ.

The law of variation of the angle of phase-shifting ϕ according to the speed of rotation N and the voltage of the network Vbat+X, and, complementarily, the law of variation of the pre-fluxing time Tpref according to the network voltage Vbat+X, are tabulated in one or more memories of the control device 12 of the alternator—starter 1, which determines the angle profile for control of the electrical machine 3, and the appropriate pre-fluxing time Tpref, according to the supply voltage Vbat+X which is applied to it.

It will be appreciated that the invention is not limited to the above-described preferred embodiment alone.

The measurements and test results are provided by way of example only for an alternator—starter of type 144/5 (diameter of the stator: 144 mm; number of turns: 5) and an EDLC ultra-capacitor of 1500 F/25V.

The angle profiles which are shown in FIG. 5 are those which are suitable for this model when the pre-fluxing time Tpref is constant, and is set to approximately 150 ms.

In these conditions, the electrical machine 3 reaches approximately 2000 rpm in 450 ms, i.e. the thermal engine 2, which is coupled to it by a transmission with a ratio of approximately 2.5, reaches in the same time a reference speed of rotation of approximately 800 rpm, irrespective of the voltage of the on-board electrical network Vbat+X contained in the range V1, V2 of 18 V to 24 V.

The foregoing description would apply to other models of alternator—starters 1, or other types of energy storage devices, for example an Ni-MH battery as a replacement for the ultra-capacitor 14, by simply selecting numerical parameter values which are different from those indicated.

On the contrary, the invention thus incorporates all the possible variant embodiments which would remain within the context defined by the following claims.

The invention claimed is:

1. A method for controlling a starting time (Tdem) of a thermal engine (2) of a vehicle, said engine (2) being coupled mechanically to a polyphase rotary electrical machine with an inductor (3) comprising phase windings (10) and sensors (13) for a position of a rotor (5), a number of said sensors (13) being equal to a number of phases of said polyphase rotary electrical machine, said machine being connected to an on-board electrical network, said method comprising the step of pre-fluxing by establishing an excitation current in said inductor (8) for a predetermined pre-fluxing time (Tpref) before establishment of phase currents controlled by control signals (Sw1, Sw2, Sw3) phase-shifted by an angle of phase-shifting (ϕ) variable according to a speed of rotation (N) of said rotary electrical machine (2), relative to synchronization signals (Si1, Si2, Si3) produced by said sensors (13), wherein, during said starting time (Tdem), said angle of phase-shifting (ϕ) is dependent on a voltage (Vbat+X) of said on-board electrical network, contained between a first voltage (V1) and a second voltage (V2) which is higher than the first voltage (V1).

2. The method according to claim 1, wherein said starting time (Tdem) is independent from said voltage (Vbat+X).

3. The method according to claim 1, wherein said angle of phase-shifting (ϕ) for a present value (Ni) of said speed of rotation (N) is decreased when said voltage (Vbat+X) increases between said first voltage (V1) and said second voltage (V2).

4. The method according to claim 1, wherein, for each present value (Ni) of said speed of rotation (N), said angle of phase-shifting (ϕ) is constantly lower than, or equal to, a maximum angle of phase-shifting (ϕmax) below which said starting time (Tdem) is higher than a reference threshold (Tdem-ref), when said voltage (Vbat+X) is equal to said first voltage (V1).

5. The method according to claim 1, wherein said predetermined pre-fluxing time (Tpref) is dependent on said voltage of said on-board electrical network (Vbat+X).

6. The method according to claim 5, wherein said predetermined pre-fluxing time (Tpref) is decreased when said voltage (Vbat+X) increases between said first voltage (V1) and said second voltage (V2).

7. A device for controlling a starting time (Tdem) of a thermal engine (2) of a vehicle, said engine (2) being coupled mechanically to a polyphase rotary electrical machine with an inductor (3) comprising phase windings (10) and sensors (13) for the position of a rotor (5), a number of said sensors (13) equal to a number of phases of said polyphase rotary electrical machine, said machine (3) being supplied by power circuits (9, 11) connected to at least one on-board electrical network, and controlled by a control circuit (12), said control circuit (12) comprising:

first means for controlling phase currents by controls signals (Sw1, Sw2, Sw3) phase-shifted by an angle of phase-shifting (ϕ) which is variable according to a speed of rotation (N) of said machine (3), relative to synchronization signals (Si1, Si2, Si3) produced by said sensors (13);

second means for controlling pre-fluxing; and third means for determination of said angle of phase-shifting (ϕ) during said starting time (Tdem), according to a voltage of said at least one on-board electrical network (Vbat+X).

8. The device according to claim 7, wherein said third means for determination are included in said first means for controlling, and comprise a memory containing tabulation of said angle of phase-shifting (ϕ) according to said speed of rotation (N) and said voltage (Vbat+X).

9. The device according to claim 8, further comprising fourth means for determination of a pre-fluxing time (Tpref) according to a voltage of said on-board electrical network (Vbat+X).

10. The device according to claim 9, wherein said fourth means for determination are included in said second means for controlling, and comprise a memory containing tabulation of said predetermined pre-fluxing time (Tpref) according to said voltage (Vbat+X) for a reference threshold of said starting time (Tdem-ref).

11. The device according to claim 10, wherein said on-board electrical network is connected to terminals of at least one ultra-capacitor (14).

12. The device according to claim 8, wherein said starting time (Tdem) is constantly approximately 450 ms when said voltage (Vbat+X) varies between 18 V (V1) and 24 V (V2).

* * * * *